United States Patent
Ye et al.

(10) Patent No.: US 8,769,026 B2
(45) Date of Patent: *Jul. 1, 2014

(54) SERVICING REQUESTS THAT ARE ISSUED IN A PROTOCOL OTHER THAN THE PROTOCOL EXPECTED BY THE SERVICE

(75) Inventors: Zhou Ye, Fremont, CA (US); Calvin Wang, Millbrae, CA (US)

(73) Assignee: Oracle International Corporation, Redwood Shores, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 13/305,614

(22) Filed: Nov. 28, 2011

(65) Prior Publication Data
US 2012/0072516 A1  Mar. 22, 2012

Related U.S. Application Data

(63) Continuation of application No. 10/097,389, filed on Mar. 12, 2002.

(60) Provisional application No. 60/337,359, filed on Nov. 30, 2001.

(51) Int. Cl.
*G06F 15/16* (2006.01)

(52) U.S. Cl.
USPC ........... 709/206; 709/228; 709/229; 709/230; 709/231; 709/237

(58) Field of Classification Search
USPC .................. 709/206, 228, 229, 230, 231, 227
See application file for complete search history.

(56) References Cited

U.S. PATENT DOCUMENTS

| | | | |
|---|---|---|---|
| 5,881,239 A * | 3/1999 | Desgrousilliers | 709/226 |
| 6,457,060 B1 | 9/2002 | Martin et al. | |
| 7,228,333 B1 | 6/2007 | Smith | |
| 7,421,489 B2 | 9/2008 | Stewart et al. | |
| 7,519,654 B1 | 4/2009 | Smith et al. | |
| 2002/0019243 A1 | 2/2002 | Zhang et al. | |
| 2002/0049049 A1 | 4/2002 | Sandahl et al. | |
| 2002/0087545 A1 | 7/2002 | Bright et al. | |
| 2002/0087704 A1 * | 7/2002 | Chesnais et al. | 709/228 |
| 2002/0087706 A1 | 7/2002 | Ogawa | |
| 2002/0087707 A1 | 7/2002 | Stewart et al. | |
| 2003/0035409 A1 | 2/2003 | Wang et al. | |
| 2003/0093496 A1 * | 5/2003 | O'Connor et al. | 709/217 |
| 2003/0138649 A1 | 7/2003 | Qiao et al. | |
| 2011/0208838 A1 * | 8/2011 | Thomas et al. | 709/219 |

OTHER PUBLICATIONS

U.S. Appl. No. 10/097,389, filed Mar. 12, 2002, Advisory Action, Dec. 9, 2011.

* cited by examiner

*Primary Examiner* — Lan-Dai T Truong
(74) *Attorney, Agent, or Firm* — Hickman Palermo; Truong Becker; Bingham Wong LLP

(57) ABSTRACT

Techniques are provided for servicing requests that are issued in a protocol other than the protocol expected by the service. For example, many people want to use their mobile devices to interact with services, which require the ability to have multiple related messages in a session. However, their mobile devices do not have protocols that support interacting with such services. One technique provided herein is to interpose an intermediary between the mobile devices and the services to provide session capabilities on behalf of the mobile devices.

28 Claims, 6 Drawing Sheets

SERVICING REQUESTS THAT ARE ISSUED IN A PROTOCOL OTHER THAN THE PROTOCOL EXPECTED BY THE SERVICE

PRIORITY CLAIM AND CROSS-REFERENCE TO RELATED APPLICATIONS

This application is a continuation of U.S. application Ser. No. 10/097,389, now U.S. Pat. No. 8,285,880, filed on Mar. 3, 2002 entitled "Servicing Requests that are Issued in a Protocol Other than the Protocol Expected by the Service", by Zhou Ye and Calvin Wang which claims domestic priority from U.S. Provisional Application Ser. No. 60/337,359, filed on Nov. 30, 2001, entitled "Realizing Session and Synchronous Semantics Based on Asynchronous Messaging Protocols", by Zhou Ye and Calvin Wang. The entire disclosure of all the above-referenced applications are incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to providing requested information to users and more specifically to providing information to users with a protocol other than the protocol expected by the service that provides the information.

BACKGROUND OF THE INVENTION

As the popularity of the Internet grows, more and more people are accessing the Internet with their mobile devices. Many of the applications that people access on the Internet are session based. Sessions allow for multiple requests and multiple responses to complete a task.

Many of today's mobile devices that access the Internet are required to have a Web browser that communicates with session based web applications. Web browsers provide menus and hyperlinks for users to navigate through web applications (hereinafter referred to as "user navigation capabilities"). However, many people have mobile devices that do not have Web browsers. Instead these mobile devices typically use asynchronous protocols, such as e-mail and Short Message Service (SMS). Asynchronous protocols only allow for a single request, and a single response to that request, for a given task.

Therefore it can clearly be seen that there is a need for providing web capabilities, such as sessions and user navigation capabilities, to mobile devices, which use a vast array of asynchronous protocols.

SUMMARY OF THE INVENTION

Techniques are provided for servicing requests that are issued in a protocol other than the protocol expected by the service. For example, many people want to use their mobile devices to interact with services, which require the ability to have multiple related messages in a session. However, their mobile devices do not have protocols that support interacting with such services. One technique provided herein is to interpose an intermediary between the mobile devices and the services to provide session capabilities on behalf of the mobile devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method for servicing requests that are issued in a protocol other than the protocol expected by the service is described, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A System Overview

Figure 1A:
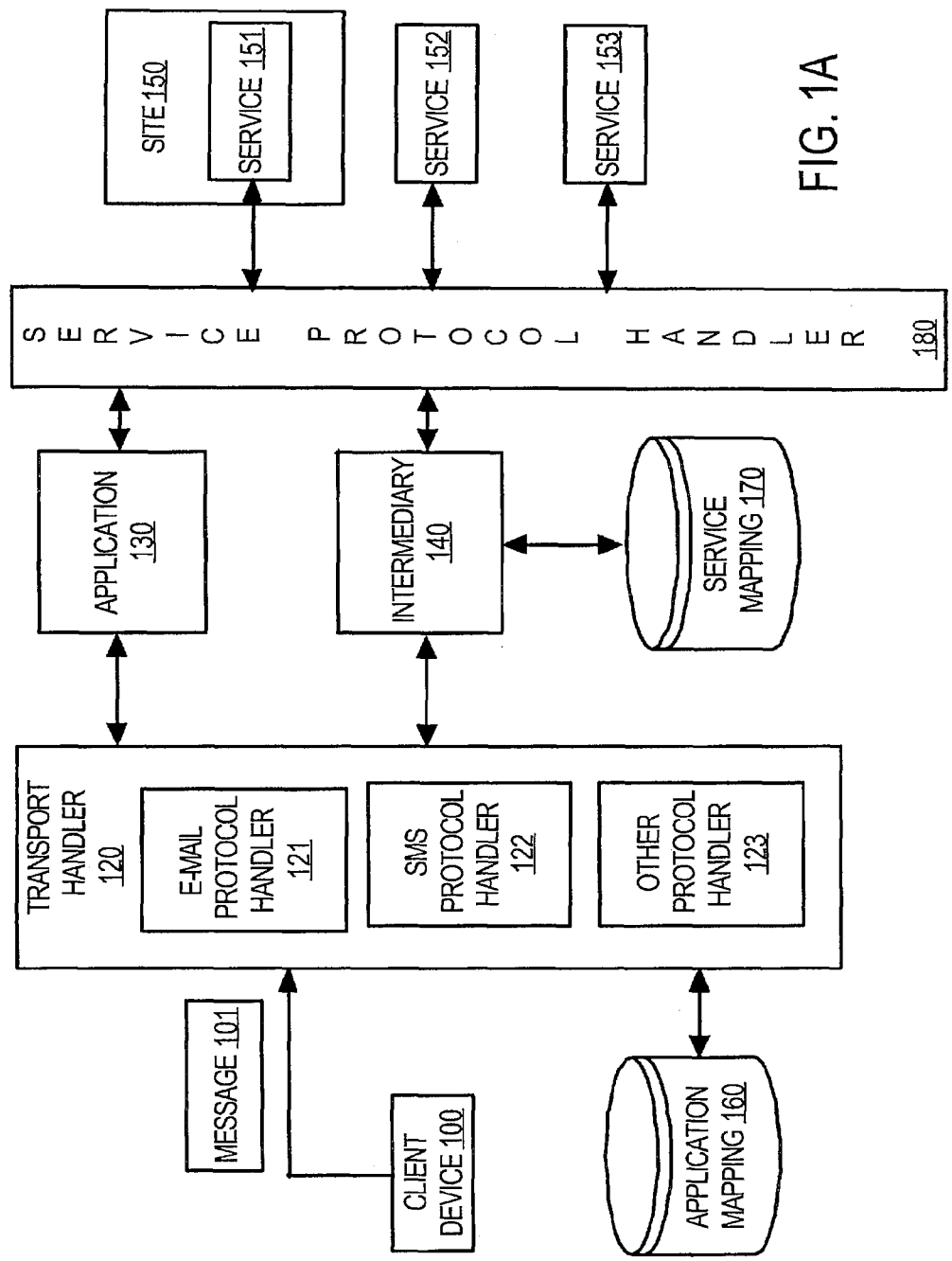
FIG. 1A is a block diagram of a system used for servicing requests that are issued in a protocol other than the protocol expected by the service.

FIG. 1A is a block diagram of a system used for servicing requests that are issued in a protocol other than the protocol expected by the service. A client device 100 is used for requesting services with a message 101. The client device 100 transmits message 101 with an asynchronous protocol such as email or SMS. Message 101 contains a request for a service and contains information for locating the service (151, 152, or 153). In one case, a to-address in message 101 is used for locating a specific service. In another case, a to-address in message 101 is used for locating a site 150 and part of message 101's content is used for locating a specific service 151 within the site 150.

A transport handler 120 encapsulates one or more asynchronous protocol handlers such as e-mail protocol handler 121, SMS protocol handler 122, and other protocol handlers 123. Each protocol handler (121, 122, 123) processes a particular type of asynchronous protocol. Therefore, transport handler 120 is capable of communicating with whatever asynchronous protocol that client device 100 uses. The protocol handler (121, 122, or 123) transmits the contents of message 101 to intermediary 140. According to one embodiment, message 101's content is in text (hereinafter referred to as "text formatted request").

Intermediary 140 receives message 101's content from one of the protocol handlers (121, 122, 123), translates message 101's content into a format that the services (151, 152, or 153) understands, forwards the request to the service (151, 152, or 153), and maintains session context as will be described in more detail. For example, message 101's content is used (1) to fill in fields of a web page or (2) to select a hyperlink, as will be described in more detail. According to one embodiment, the filled in web page is in Oracle's mobile XML™.

The service protocol handler 180 provides web protocols such as Hyper Text Transfer Protocol (HTTP). According to one embodiment, the service protocol handler 180 is provided by an Internet Service Provider (ISP). According to another embodiment, the service protocol handler 180 is a Java API that is used to register services (151, 152, 153). A service (151, 152, or 153) provides information in response to message 101. According to one embodiment, the response to message 101 is a web page. For example, the response to message 101 maybe in Oracle's mobile XML™. Service 151 is on Site 150.

Application mapping 160 contains an address-to-application mapping where valid to-addresses are mapped to applications (130, 140). An application (130 or 140) listens for specific to-addresses by registering the to-addresses with the transport handler 120. Registering the to-addresses creates mapping entries in the application mapping 160. For example, when intermediary 140 registers a particular to-address, an entry is created in application mapping 160 that maps the particular to-address to intermediary 140.

According to one embodiment, service mapping 170 maps the message 101's to-address to a specific service. According to another embodiment, service mapping 170 maps the message 101's to-address plus part of message 101's content to a specific service 151 within the site 150. These embodiments are described in more detail hereinafter.

An Operational Example

A person enters an email message 101 on client device 100. Message 101 contains a to-address that specifies service 152. Message 101 is intercepted by the transport handler 120. Since message 101 is an email, the e-mail protocol handler 121 receives message 101 from client 100, uses message 101's to-address to locate an entry in application mapping 160, and uses the entry to determine which application (130 or 140) to forward the message 100 to. Assuming the entry maps to intermediary 140, the e-mail protocol handler 121 forwards message 100 to intermediary 140. Intermediary 140 uses the message 100's to-address or the message 100's to-address plus part of message 100's contents to locate an entry in the service mapping 170. The entry in the service mapping 170 is used to determine which service (151, 152, or 152) the contents of message 101 are to be forwarded to. Assuming that service 152 expects requests in the form of a filled out web page, intermediary 140 uses the contents of message 101 to fill out the web page, communicates the filled out web page to service 152, and maintains session context as will be described in more detail hereinafter. Assuming that service 152 expects to receive requests using the HTTP protocol, service protocol handler 140 intercepts the filled out web page and transmits it to service 152 using HTTP. Then service 152 transmits a response and the process is reversed.

Addressing Considerations

Figure 1B:
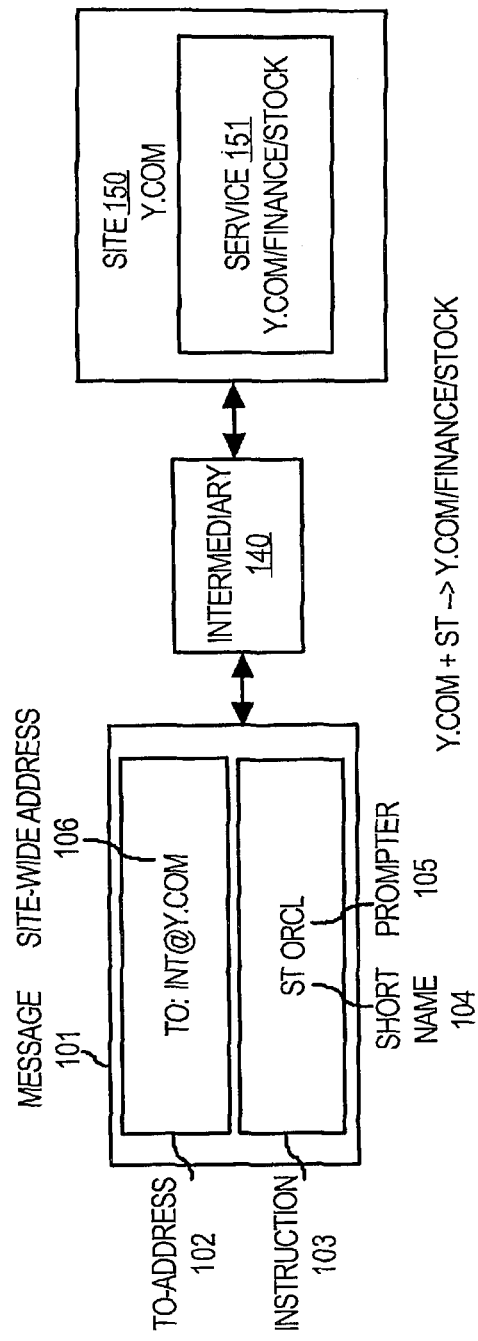
FIG. 1B is a block diagram that shows a message in which the to-address corresponds to a site and the message content is used to locate a service within the site.

FIG. 1B is a block diagram that shows a message in which the to-address corresponds to a site and the message content is used to locate a service within the site. The message 101 designates a to-address 102 and a message body. The to-address 102 is int@y.com includes a site-wide address 106, y.com. For example, the site-wide address 106, y.com, corresponds to a site, not to a specific service.

The message body contains an instruction 103. According to one embodiment, the instruction 103 has two parts—a short name 104 and a prompter 105. Instruction 103, "ST ORCL", specifies a particular service provided by the specified site and provides a parameter value related to that service. Specifically, the "ST" designates a stock quote service and "ORCL" designates that the stock is for Oracle.

Intermediary 140 is an application that listens for the to-address 102, int@y.com. Site 150 is at the site-wide address 106, y.com. Service 151 is a stock service in site 150 at address y.com/finance/stock. Since the to-address 102 included a site-wide address 106, y.com, a short name 104, "ST", is used to designate a service 151 within the site 150. Intermediary 140 transmits the prompter 105, "ORCL", to service 151.

If site-wide addressing is used with the SMS protocol, the to-address is a phone number like 1234567. Then phone number 1234567 designates the site 150. The short message 104, "ST", is used to designate the service 151 within site 150.

Figure 1C:
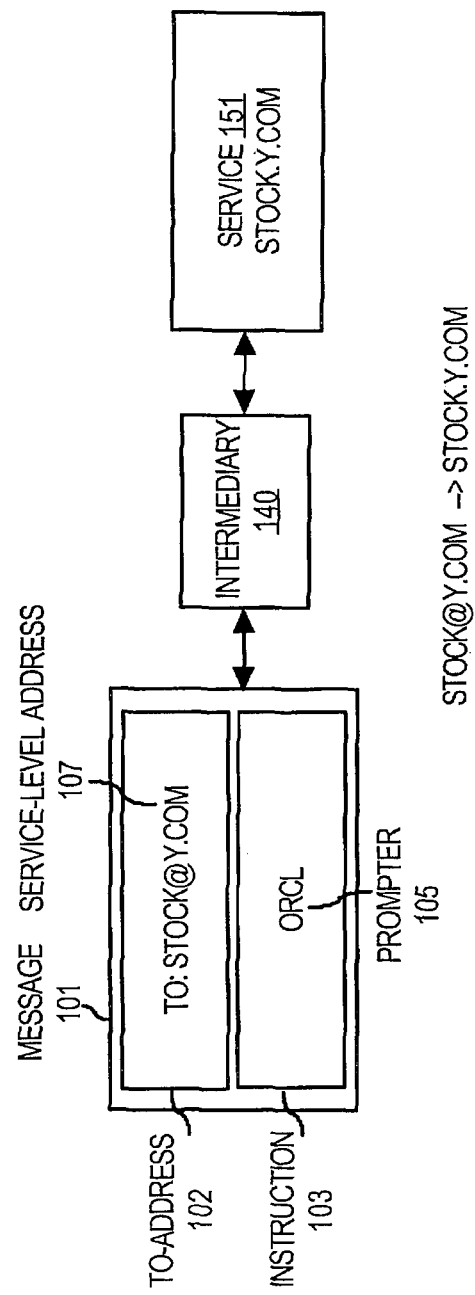
FIG. 1C is a block diagram that shows a message in which the to-address corresponds to a specific service.

FIG. 1C is a block diagram that shows a message in which the to-address corresponds to a specific service. The to-address 102 is stock@y.com. The service-level address 107 is also stock@y.com. The message body contains an instruction 103, "ORCL", to obtain a quote for Oracle stock. According to one embodiment, the instruction 103 has one part—prompter 105.

Intermediary 140 listens for the to-address 102, stock@y.com. Service 151 is a stock quote service, which is at stock.y.com. Intermediary 140 transmits the prompter 105, "ORCL", to service 151.

Figure 1D:
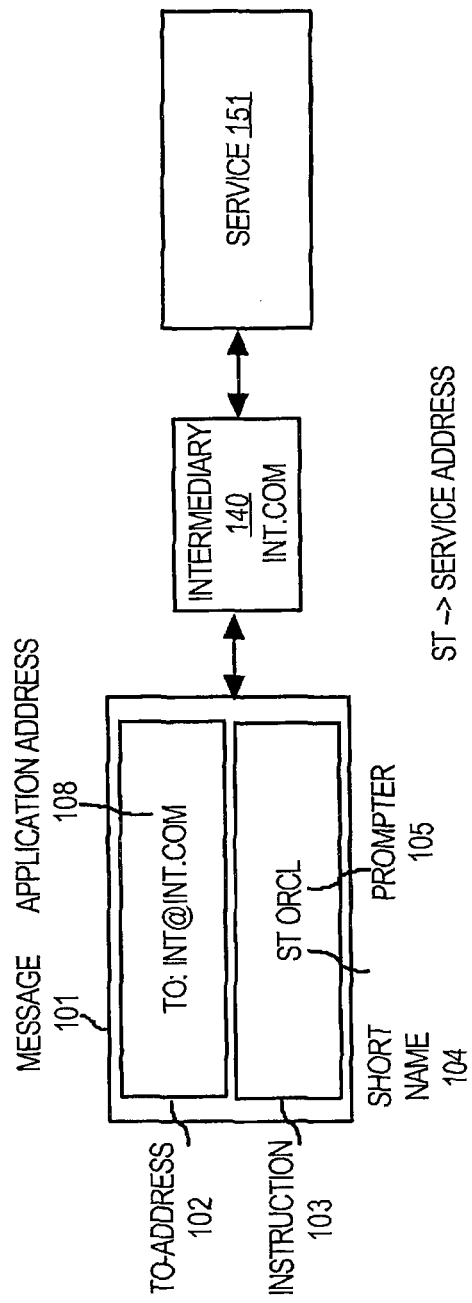
FIG. 1D is a block diagram that shows a message in which the to-address corresponds to a particular application.

FIG. 1D is a block diagram that shows a message in which the to-address corresponds to a particular application. The to-address 102 is int@int.com. The to-address 102 includes an application address 108, int.com.

Intermediary 140 listens for the to-address 102, int@int.com. Intermediary 140 is at the application address 108, int.com. Intermediary 140 uses the short name 104, "ST", to determine the service address of service 151. In this example, service 151 can be contacted by the intermediary using either site-wide addressing, y.com/finance/stock, or service-level addressing, stock.y.com. Intermediary 140 transmits the prompter 105, "ORCL", to service 151. Although these examples describe transmitting the prompter 105 to the service 151, other items may be transmitted in addition to or instead of the prompter 105.

User Navigation Capabilities and Sessions

Figure 2:
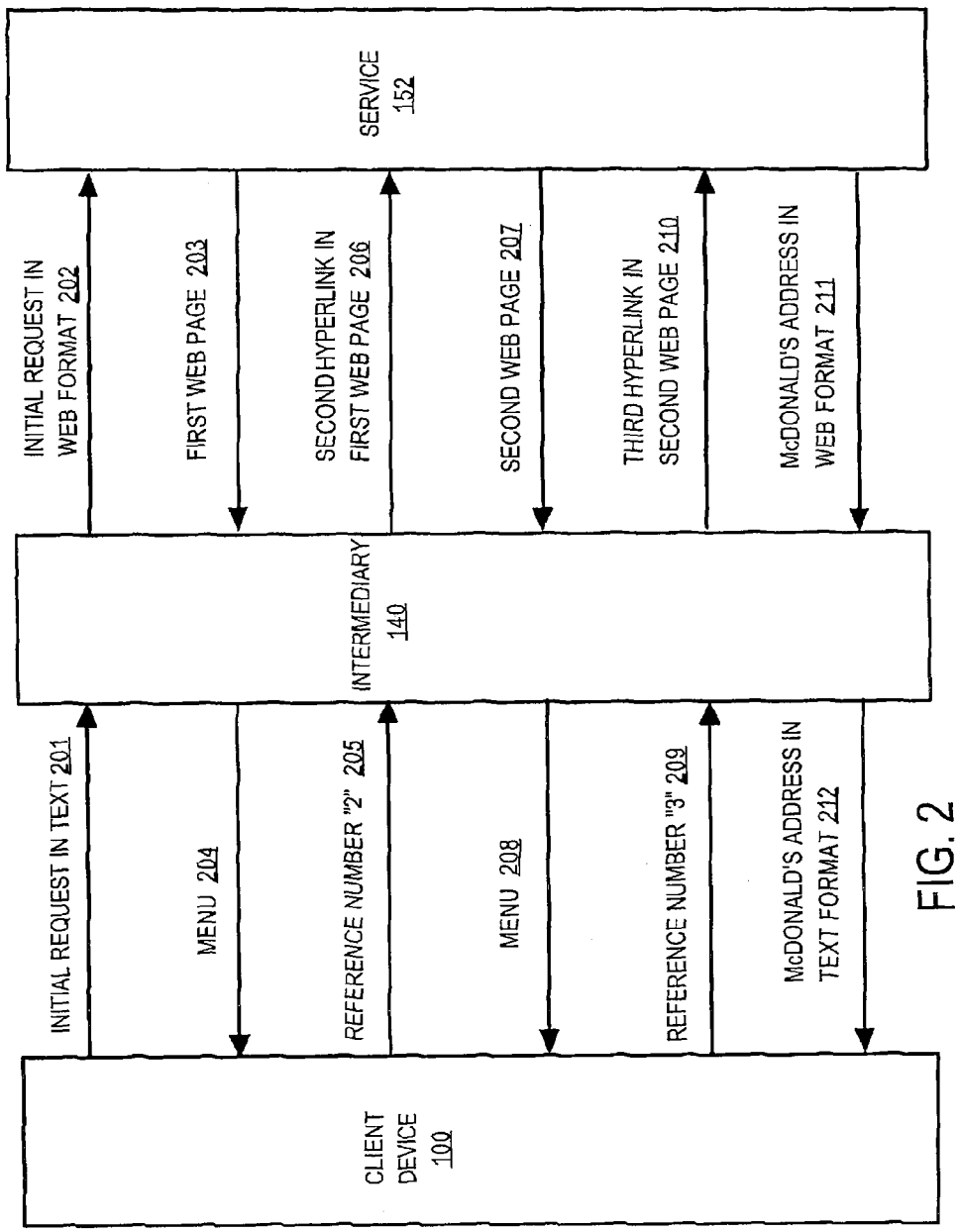
FIG. 2 is a block diagram illustrating message flow between a client device, an intermediary, and a service.

FIG. 2 is a block diagram illustrating message flow between a client device, an intermediary, and a service. According to one embodiment, a person can request information from a service that returns a web page. The web page may include menu items and/or hyperlinks (hereinafter referred to as "web formatted response"). According to one embodiment, the menu items and the hyperlinks are translated into text format for display on the mobile device. This is accomplished by translating the menu items and hyperlinks into descriptive text preceded by a user selectable reference number.

The reference numbers preceeding the descriptive text connect menus in a menu tree. As the user traverses the menu tree by selecting reference numbers, intermediary 140 maintains a session context by saving the selected reference numbers. Therefore, intermediary 140 has knowledge of where the user currently is in the menu tree. According to one embodiment, the session context is maintained as a part of a state machine.

According to one embodiment, the session context is stored and maintained by intermediary 140. When intermediary 140 receives a request from a client device 100, intermediary 140 inspects the device ID associated with the request. If a session context does not already exist for that device ID, intermediary 140 creates a session context. According to one embodiment, the session context includes the device ID of client device 100, reference numbers the user selects, and the web formatted response. The session context is released when the session ends.

According to one embodiment, the session is terminated when a timer runs out. According to a second embodiment, the session context is used to determine when to terminate the session. For example, the session is terminated when the session context indicates that the user has exited the service. According to a third embodiment, both the session context and a timer are used to determine when to terminate the session depending on which condition occurs first. For example, the session ends at the earliest of a timer ending or the user exiting the menu tree.

Menu 204 and menu 208 below illustrate a menu tree where selecting the reference number 2 on menu 204 results in menu 208 being displayed to the user. For example, a user may request addresses of eating establishments nearest the user's home by entering a to-address 102, info@oraclemobile.com, and an instruction 103, "yp eating_establishments home" (hereinafter referred to as the "initial request in text 201"). The short name "yp" stands for Yellow Pages and the "home" parameter indicates that the eating establishments should be close to the user's home.

The user's initial request in text 201 is transmitted to a service (151, 152, or 153). FIGS. 1B, 1C, and 1D are also examples of initial requests in text 201. The intermediary 140 intercepts the initial request in text 201 and uses its contents to create the initial request in web format 202. The service address is derived based on the to-address 102 in the initial request in text 201 as already described herein. The service 152 responds with a first web page 203. In this example, the first web page 203 has two hyperlinks: a first for fine restaurants and a second for burger joints. Intermediary 140 intercepts the first web page 203, associates the first web page 203 with the session context, translates the first web page 203 into a text formatted message, menu 204, and transmits the menu 204 to the client device 100. Menu 204 is displayed on the client device 100 as follows:

MENU 204
1 fine restaurants
2 burger joints

The reference number "2" (205) is entered on the client device 100 as a request for a list of burger joints near the user's home area. Intermediary 140 saves the reference number "2" in the session context. Intermediary 140 translates the reference number "2" into a response the service 152 understands by using the first web page 203. For example, intermediary 140 translates the user selected reference number "2" into a selection of the second hyperlink, which is for burger joints, in the first web page 203. The selection of the second hyperlink 206 is communicated to the service 152. The service 152 responds with a second web page 207, which is a list of burger joints. The second web page 207 has four hyperlinks: a first for Burger King, a second for Carl's Junior, a third for McDonalds, and a fourth for Wendy's. Intermediary 140 intercepts the second web page 207, associates the second web page 207 with the session context, translates the second web formatted response into menu 208, and transmits the menu 208 to the client device 100. Menu 208 is displayed on the client device 100 as follows:

MENU 208
1 Burger King
2 Carl's Junior
3 McDonalds
4 Wendy's

The reference number "3" (209) is entered on the client device 100 as a request for the McDonald's address nearest the user's home. Intermediary 140 saves the reference number "3" in the session context.

Intermediary 140 translates the reference number "3" (209) into a response the service 152 understands by using the second web page 207. For example, intermediary 140 translates the user selected reference number "3" into a selection of the third hyperlink, which is for McDonalds, in the second web page 207. The selection of the third hyperlink 210 is communicated to a service 152. The service 152 responds with McDonald's address in web format 211. Intermediary 140 intercepts the McDonald's address in web format 211, translates McDonald's address in web format 211 into McDonald's address in text format 212, and transmits McDonald's address in text format 212 to the client device 100. If service 152 transmits the McDonald's address to intermediary 140 in text, then no translation is necessary. McDonald's address in text format 212 is displayed on the client device 100.

At this point, intermediary 140 determines that the user's initial request in text 201 has been satisfied. The user entered three requests: the initial request in text 201, reference number "2" (205) and reference number "3" (209). The user received 3 responses—Menu 204, Menu 208, and the McDonald's address 212. The three requests and three responses involved in completing the task is an example of a session. As can be seen, maintaining session context provides session capabilities and user navigation capabilities for mobile devices communicating with asynchronous protocols.

According to one embodiment, the user can escape from the middle of navigating a menu tree and proceed with a new request by entering an escape key. For example, if the user decides to check Oracle stock prices after requesting eating establishments but before receiving an eating establishment's address, the user can enter an escape key. Then the user can request Oracle stock prices as already described herein.

A Continuous Active Connection is Not Required

Figure 3:
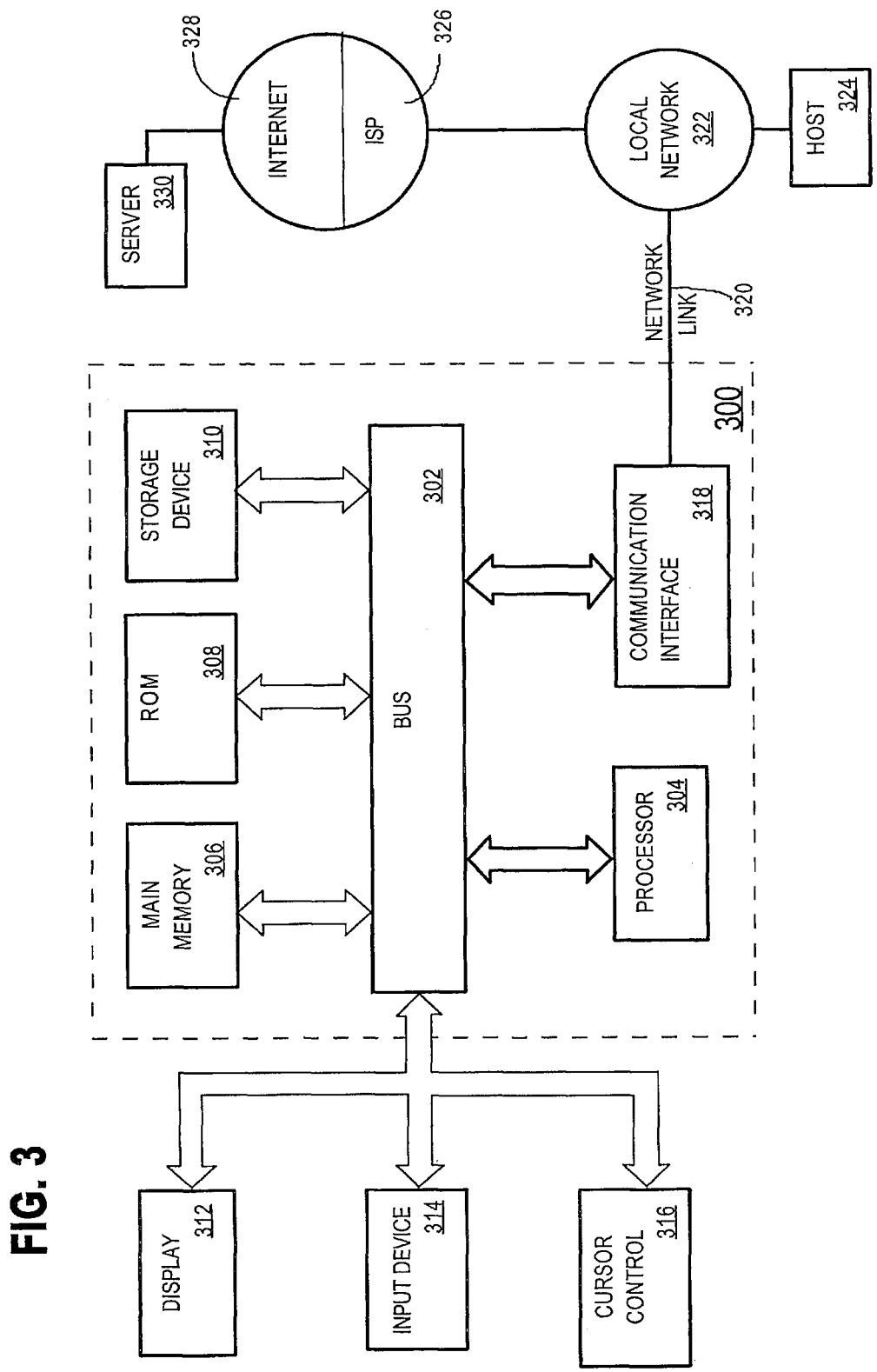
FIG. 3 is a block diagram that illustrates a computer system upon which embodiments of the invention may be implemented.

Unlike web applications that support sessions, a continuous active connection is not required for the duration of a "session" since asynchronous protocols are used between client device 100 and intermediary 140. For example, when a person using a mobile device, communicating with a synchronous web protocol, enters a tunnel, communications are interrupted. The connection has to be reestablished in order for the person to receive the requested information. In contrast, when a person using a client device 100, communicating with an asynchronous protocol, enters a tunnel and communications are interrupted, the person can still receive the remaining information once the person is out of the tunnel Hardware Overview FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM)

or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   an intermediary registering a to-address with a transport handler, wherein the intermediary is an application and the to-address identifies an address of a server;
   in response to registering the to-address, the transport handler updating an intermediary map with an entry that maps the to-address to the intermediary;
   the transport handler receiving a first message traveling from a client to the server, the first message conforming to a first protocol and specifying the to-address;
   the transport handler selecting the intermediary from a plurality of intermediaries based on (a) the first message specifying the to-address, and (b) the intermediary map having the entry that maps the to-address to the intermediary;
responsive to selecting the intermediary, the transport handler forwarding content from the first message to the intermediary; and
in response to receiving the content, the intermediary transforming the content into a second message conforming to a second protocol that is different than the first protocol;
in response to transforming the content into the second message, the intermediary sending the second message to a service hosted at the server;
wherein the method is performed by one or more computing devices.

2. The method of claim 1, further comprising:
selecting, by a transport handler, a protocol handler from a plurality of protocol handlers, and using the selected protocol handler to receive and interpret the first message, wherein the selected protocol handler is selected based on information in said first message, wherein the protocol handler transmits the content from the first message to said intermediary, wherein the intermediary is different from the protocol handler.

3. The method of claim 2, wherein receiving and interpreting the first message includes: extracting the to-address and an instruction from the first message; and
determining an address of the intermediary based at least in part on the to-address.

4. The method of claim 3, wherein the protocol handler is an e-mail protocol handler, and extracting the to-address is performed by the e-mail protocol handler.

5. The method of claim 3, wherein the protocol handler is an SMS protocol handler, and extracting the to-address is performed by the SMS protocol handler.

6. The method of claim 1 wherein the second protocol is HTTP.

7. The method of claim 1 wherein the first protocol does not support sessions.

8. The method of claim 1, further comprising:
the intermediary receiving a third message from the server that conforms to the second protocol;
the intermediary transforming content from the third message into a fourth message that conforms to the first protocol;
placing, by the intermediary, one or more reference values in the fourth message that can be used by said client device to request additional services using the first protocol, wherein the intermediary stores an association between each reference value of the one or more reference values and a corresponding hyperlink of a set of hyperlinks received by the intermediary within the third message, wherein the association is released by the intermediary upon termination of a session between the client and the server, wherein the set of hyperlinks provides access to the additional services, and wherein the first protocol does not support using hyperlinks of the set of hyperlinks directly to request the additional services.

9. The method of claim 8, wherein said fourth message includes a menu containing the one or more reference values corresponding to a plurality of hyperlinks that provide access to the additional services.

10. The method of claim 9, further comprising:
receiving a fifth message from the client at the intermediary, wherein said fifth message contains a reference value of said one or more reference values;
wherein said reference value in the fifth message is a selection from the menu in the fourth message, and further comprising:
maintaining at the intermediary a session context that includes the reference value in the fifth message.

11. The method of claim 10, wherein a particular hyperlink that is associated with the reference value contained in the fifth message is used to send a sixth message to the server.

12. The method of claim 8, further comprising ending the session at the earlier of a timer ending or a user exiting a menu tree.

13. The method of claim 1, wherein the intermediary maintains data that reflects a position of the client in a menu tree associated with a service provided by the server.

14. The method of claim 1, further comprising:
determining whether the to-address identifies a particular service or does not identify any particular service;
in response to determining that the to-address identifies the particular service, selecting a target service from a plurality of services provided by the server based on the to-address;
in response to determining that the to-address does not identify any particular service, selecting the target service from the plurality of services provided by the server based on a service identifier contained within a message body of the first message;
wherein the intermediary sends the second message to the target service.

15. A non-transitory computer-readable medium storing one or more sequences of instructions which when executed by one or more processors, cause the one or more processors to perform steps comprising:
an intermediary registering a to-address with a transport handler, wherein the intermediary is an application and the to-address identifies an address of a server;
in response to registering the to-address, the transport handler updating an intermediary map with an entry that maps the to-address to the intermediary;
the transport handler receiving a first message traveling from a client to the server, the first message conforming to a first protocol and specifying the to-address;
the transport handler selecting the intermediary from a plurality of intermediaries based on (a) the first message specifying the to-address, and (b) the intermediary map having the entry that maps the to-address to the intermediary;
responsive to selecting the intermediary, the transport handler forwarding content from the first message to the intermediary; and
in response to receiving the content, the intermediary transforming the content into a second message conforming to a second protocol that is different than the first protocol;
in response to transforming the content into the second message, the intermediary sending the second message to a service hosted at the server.

16. The non-transitory computer-readable medium of claim 15,
wherein the steps further comprise:
selecting, by a transport handler, a protocol handler from a plurality of protocol handlers, and using the selected protocol handler to receive and interpret the first message, wherein the selected protocol handler is selected based on information in said first message, wherein the protocol handler transmits the content from the first message to said intermediary.

17. The non-transitory computer-readable medium of claim 16,
   wherein receiving and interpreting the first message includes:
      extracting the to-address and an instruction from the first message; and
      determining an address of the intermediary based at least in part on the to-address.

18. The non-transitory computer-readable medium of claim 17, wherein the protocol handler is an e-mail protocol handler, and extracting the to-address is performed by the e-mail protocol handler.

19. The non-transitory computer-readable medium of claim 17, wherein the protocol handler is an SMS protocol handler, and extracting the to-address is performed by the SMS protocol handler.

20. The non-transitory computer-readable medium of claim 15, wherein the second protocol is HTTP.

21. The non-transitory computer-readable medium of claim 15, wherein the first protocol does not support sessions.

22. The non-transitory computer-readable medium of claim 15, wherein the steps further comprise:
   the intermediary receiving a third message from the server that conforms to the second protocol;
   the intermediary transforming content from the third message into a fourth message that conforms to the first protocol;
   placing, by the intermediary, one or more reference values in the fourth message that can be used by said client device to request additional services using the first protocol, wherein the intermediary stores an association between each reference value of the one or more reference values and a corresponding hyperlink of a set of hyperlinks received by the intermediary within the third message, wherein the association is released by the intermediary upon termination of a session between the client and the server, wherein the set of hyperlinks provides access to the additional services, and wherein the first protocol does not support using hyperlinks of the set of hyperlinks directly to request the additional services.

23. The non-transitory computer-readable medium of claim 22, wherein said fourth message includes a menu containing the one or more reference values corresponding to a plurality of hyperlinks that provide access to the additional services.

24. The non-transitory computer-readable medium of claim 23,
   wherein the steps further comprise:
   receiving a fifth message from the client at the intermediary, wherein said fifth message contains a reference value of said one or more reference values;
   wherein said reference value in the fifth message is a selection from the menu in the fourth message, and further comprising:
   maintaining at the intermediary a session context that includes the reference value in the fifth message.

25. The non-transitory computer-readable medium of claim 24, wherein a particular hyperlink that is associated with the reference value contained in the fifth message is used to send a sixth message to the server.

26. The non-transitory computer-readable medium of claim 22, wherein the steps further comprise ending the session at the earlier of a timer ending or a user exiting a menu tree.

27. The non-transitory computer-readable medium of claim 15, wherein the steps further comprise the intermediary maintaining data that reflects a position of the client in a menu tree associated with a service provided by the server.

28. The non-transitory computer-readable medium of claim 15
   wherein the steps further comprise:
   determining whether the to-address identifies a particular service or does not identify any particular service;
   in response to determining that the to-address identifies the particular service, selecting a target service from a plurality of services provided by the server based on the to-address;
   in response to determining that the to-address does not identify any particular service, selecting the target service from the plurality of services provided by the server based on a service identifier contained within a message body of the first message;
   wherein the intermediary sends the second message to the target service.

* * * * *

UNITED STATES PATENT AND TRADEMARK OFFICE
CERTIFICATE OF CORRECTION

| | | |
|---|---|---|
| PATENT NO. | : 8,769,026 B2 | Page 1 of 1 |
| APPLICATION NO. | : 13/305614 | |
| DATED | : July 1, 2014 | |
| INVENTOR(S) | : Ye et al. | |

It is certified that error appears in the above-identified patent and that said Letters Patent is hereby corrected as shown below:

In the Specification:

In column 4, line 59, delete "preceeding" and insert -- preceding --, therefor.

Signed and Sealed this
Twenty-fourth Day of February, 2015

Michelle K. Lee
*Deputy Director of the United States Patent and Trademark Office*